United States Patent [19]

Nozaki et al.

[11] Patent Number: 5,407,628
[45] Date of Patent: Apr. 18, 1995

[54] METHOD OF FORMING A MOLDED PORTION OF A WEATHER STRIP

[75] Inventors: Masahiro Nozaki, Ama; Toshiyuki Sumi, Gifu, both of Japan

[73] Assignee: Toyoda Gosei Co., Ltd, Nishikasugai, Japan

[21] Appl. No.: 43,586

[22] Filed: Apr. 5, 1993

Related U.S. Application Data

[63] Continuation of Ser. No. 659,950, Feb. 25, 1991, abandoned.

[30] Foreign Application Priority Data

Feb. 28, 1990 [JP] Japan .................................. 2-48310

[51] Int. Cl.$^6$ ............................................. B29C 45/14
[52] U.S. Cl. .................................. 264/261; 264/259; 264/328.12
[58] Field of Search ............... 264/265, 266, 294, 296, 264/297.2, 320, 328.12, 261, 259; 425/387.1

[56] References Cited

U.S. PATENT DOCUMENTS

| | | | |
|---|---|---|---|
| 4,183,778 | 1/1980 | Mensel | 264/261 |
| 4,495,234 | 1/1985 | Tominaga et al. | 49/476 |
| 4,769,947 | 9/1988 | Ogawa et al. | 49/479 |
| 4,884,370 | 12/1989 | Nozaki et al. | 49/479 |
| 4,964,620 | 10/1990 | Omura et al. | 264/261 |
| 4,977,706 | 12/1990 | Kisanuki | 49/479 |

Primary Examiner—Jan H. Silbaugh
Assistant Examiner—Angela Ortiz
Attorney, Agent, or Firm—Cushman, Darby & Cushman

[57] ABSTRACT

A method for forming a molded portion composed of solid rubber onto an end of an extruded weather strip having a base portion composed of solid rubber and a lip-shaped sealing portion composed of sponge rubber and extending from the base portion. The method includes the steps of inserting the end of the extruded weather strip into a cavity of a mold, the cavity having a cross-sectional shape identical with that of the end of the extruded weather strip. The method further includes injecting a molding material into the cavity from a gate of the mold while throttling the molding material flowing to the end of the lip-shaped sealing portion of the extruded weather strip by a protruding portion protruding into a passageway of the cavity leading to the end of the lip-shaped sealing portion of the extruded weather strip at a position close thereto. This causes the pressure of the molding material acting on the end of the lip-shaped sealing portion of the extruded weather strip to be smaller than that of the molding material acting on an end of the base portion of the extruded weather strip.

5 Claims, 5 Drawing Sheets

METHOD OF FORMING A MOLDED PORTION OF A WEATHER STRIP

This is a continuation of application Ser. No. 07/659,950, filed on Feb. 25, 1991, which was abandoned upon the filing hereof.

BACKGROUND OF THE INVENTION

1. Field of the Invention

The present invention relates to a method for forming a molded portion of a weather strip, and more particularly to a method for forming a molded portion composed of solid rubber onto an end of an extruded weather strip having a solid rubber portion and a sponge rubber portion.

2. Description Related Art

Examples of the weather strip provided with the above-described type of the molded portion include a roof side weather strip to be attached along a roof side of a motor vehicle, and a door weather strip to be attached to a door frame of a motor vehicle.

In the motor vehicle as shown in FIG. 7, a roof side weather strip 1 is attached to a roof side 4 of a vehicle body for providing a seal between the roof side 4 and a door frame 5. A door glass weather strip 2 is attached to the door frame 5 for providing a seal between the door frame 5 and a peripheral edge of a door glass 6, as shown in FIG. 8.

The roof side weather strip 1 has a base portion 11 composed of solid rubber, and sealing portions 12, 13 composed of sponge rubber. The door glass weather strip 2 has a base portion 21 composed of solid rubber, a sealing portion 22 composed of sponge rubber, and a tubular portion 24 composed of solid rubber provided with a sealing portion 23 composed of sponge rubber. These weather strips 1, 2 are generally formed by extrusion.

A corner portion of the roof side weather strip 1, which is designated by reference character A in FIG. 7 has a molded portion 1C by which ends of two extruded weather strips 1A, 1B are connected, as shown in FIG. 9 (U.S. Pat. No. 4,884,370).

Molded portion 1C has been conventionally formed by inserting the ends of the two extruded weather strips 1A, 1B in a cavity of a mold so as to face one another, and injecting a molding material composed of solid rubber softer than that for the base portion 11 of the extruded weather strips 1A, 1B into the cavity under a predetermined injection pressure.

However, this conventional method has the following problem. When the cavity of the mold is filled with the molding material, the material forcefully pushes the ends of the extruded weather strips 1A, 1B. At this time, the sealing portions 12, 13, which are composed of a sponge rubber, can be deformed easily by the molding material, and as a result, undulations 8 are generated in the end portions of the sealing portions 12, 13, as shown in FIG. 9. These undulations 8 decrease the sealing ability of the sealing portions 12, 13 and detract from their outward appearance.

The generation of these undulations 8 can be prevented by decreasing the injection pressure of the molding material. However, as the injection pressure decreases, the molding material tends not to completely fill the cavity of the mold.

SUMMARY OF THE INVENTION

An object of the present invention is to provide a method for forming a molded portion of a weather strip without generating undulations in an end portion of a sponge rubber portion of the extruded weather strip due to the pressure of a molding material.

The method in accordance with the present invention, includes the steps of inserting an end of an extruded weather strip into a cavity of a mold, and injecting a molding material into the cavity from a gate of the mold while throttling the molding material which flows in the cavity to an end of a sealing portion of the extruded weather strip, at a position close to the end of the sealing portion, whereby the pressure of the molding material acting on the end of the sealing portion of the extruded weather strip is smaller than that of the molding material acting on an end of a base portion of the extruded weather strip.

The above-described throttling step is performed in a throttled portion formed in a passageway of the cavity. The passageway leads the molding material to the end of the sealing portion of the extruded weather strip.

Accordingly, the pressure of the molding material, which acts on the end of the sealing portion, decreases so as to prevent the molding material from forcibly pushing the end of the sealing portion of the extruded weather strip. As a result, undulations are prevented from being generated in the end portion of the sealing portion of the extruded weather strip.

BRIEF DESCRIPTION OF THE DRAWING

Other objects, features and characteristics of the present invention will become apparent upon consideration of the following detailed description of the invention and the appended claims with reference to the drawings, all of which form a part of this specification.

DETAILED DESCRIPTION OF THE PRESENTLY PREFERRED EXEMPLARY EMBODIMENTS

Figure 1:
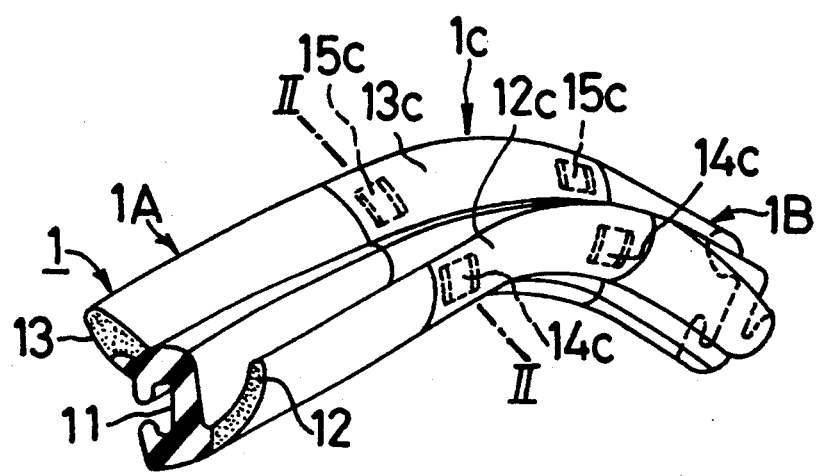
FIG. 1 is a perspective view of a corner portion of a roof side weather strip, which has a molded portion formed by a first embodiment of a method in accordance with the present invention.
Figure 2:
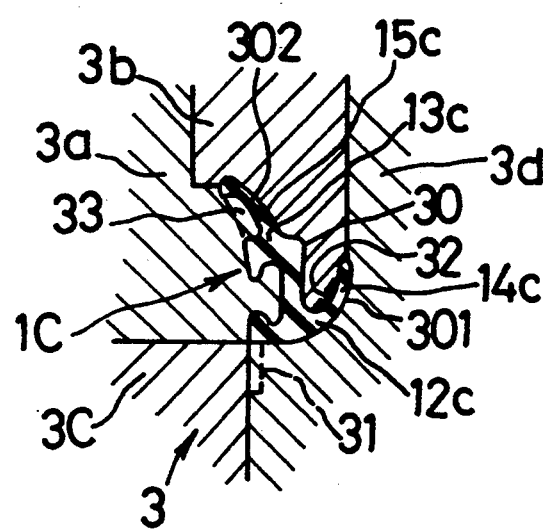
FIG. 2 is a cross-sectional view of a mold used in the first embodiment, and the molded portion taken along the line II—II of FIG. 1.
Figure 3:
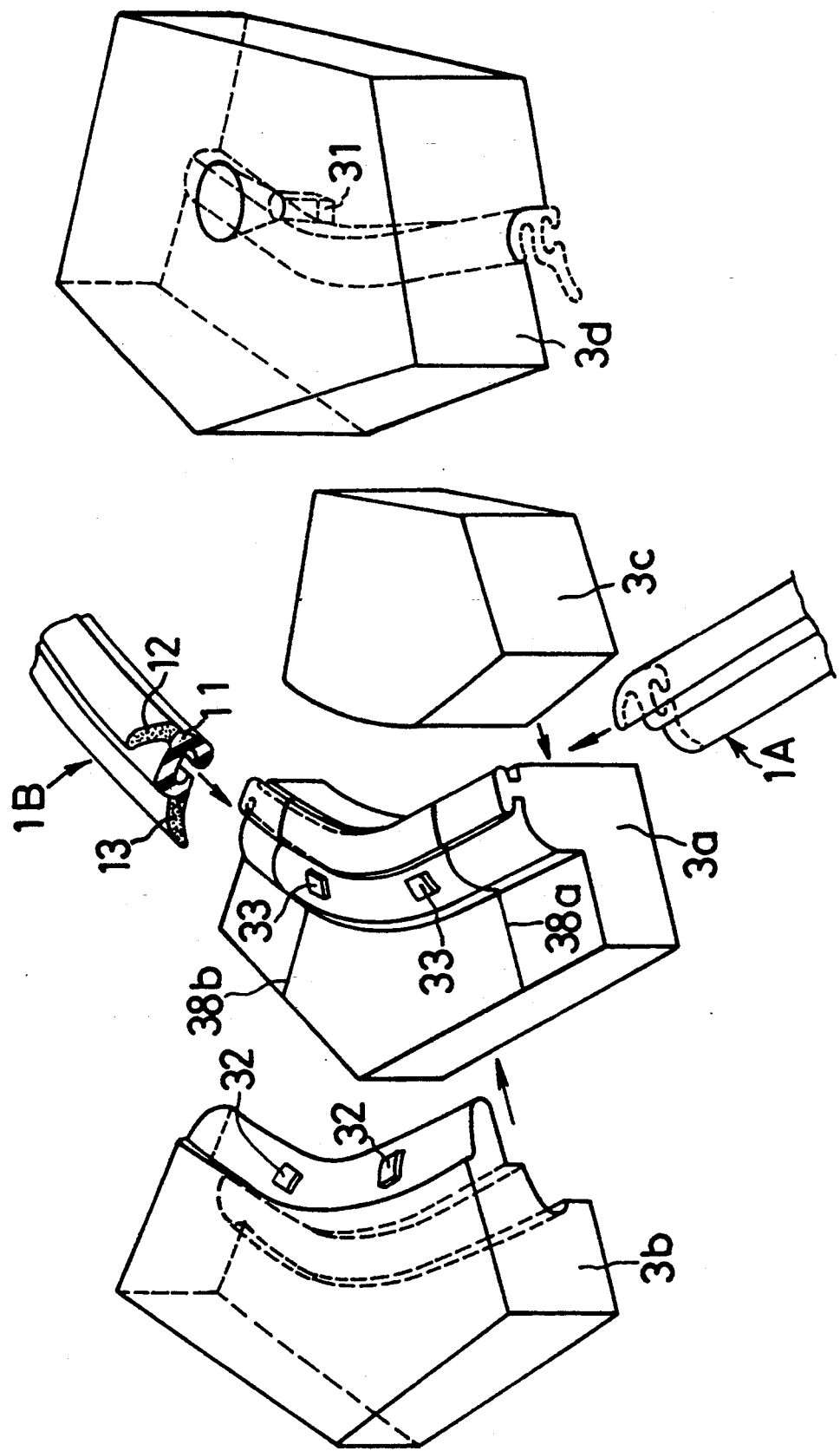
FIG. 3 is an exploded perspective view of a mold used in the first embodiment.

FIGS. 1 through 3 illustrate a first embodiment wherein a method of the present invention is applied to a roof side weather strip.

Figure 7:
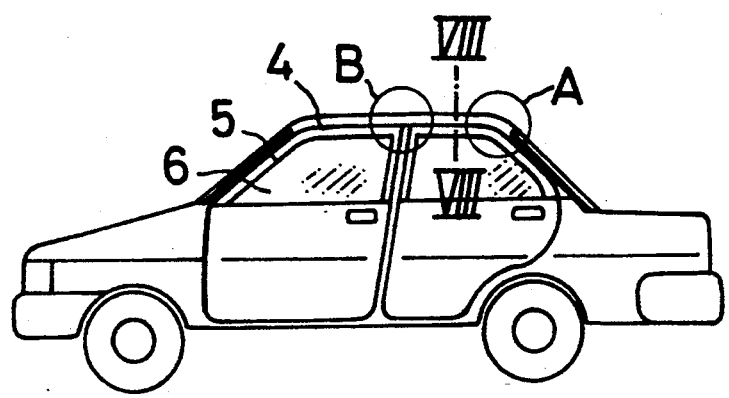
FIG. 7 is a side view of a motor vehicle.

FIG. 1 is a perspective view of a molded portion 1C which forms a corner portion of a roof side weather strip 1, which corresponds to the portion A of FIG. 7. FIG. 2 illustrates a cross section of a mold 3 and the molded portion 1C taken along the line II—II of FIG. 1. FIGURE 3 is an exploded perspective view of the mold 3.

Weather strips 1A, 1B which are connected with a molded portion 1C are extruded bodies, each having a substantially equal cross-sectional shape. Each of the extruded weather strips 1A, 1B has a base portion 11 having a C-shaped cross-section and composed of solid rubber, and lip-shaped sealing portions 12, 13 composed of sponge rubber. The molded portion 1C is composed of solid rubber which is softer than that of the base portion 11, and has a cross-sectional shape substantially equal to that of each of the extruded weather strips 1A, 1B.

The molded portion 1C is formed by using a mold 3 provided with mold members 3a, 3b, 3c, 3d which define a cavity 30, as shown in FIGS. 2 and 3. Ends of the extruded weather strips 1A, 1B are respectively mounted on end portions of the cavity 30 of the mold 3.

This mold 3 has a gate 31 between facing surfaces of the mold members 3c and 3d and at about a longitudinally center of the cavity 30 so as to face a lower end of the base portion 11. The mold member 3b has two protruding portions 32 at positions close to ends of the sealing portions 12 of the extruded weather strips 1A, 1B on the opposite side of the sealing surface of the sealing portion 12C of the molded portion 1C. The mold member 3a has two protruding portions 33 at positions close to ends of the sealing portions 13 of the extruded weather strips 1A, 1B on the opposite side of the sealing surface of the sealing portion 13C of the molded portion 1C. These protruding portions 32, 33 protrude into passageways through which a molding material injected from the gate 31 flows towards ends of the sealing portions 12, 13 of the extruded weather strips 1A, 1B, thereby defining throttled portions 301, 302.

Figure 8:
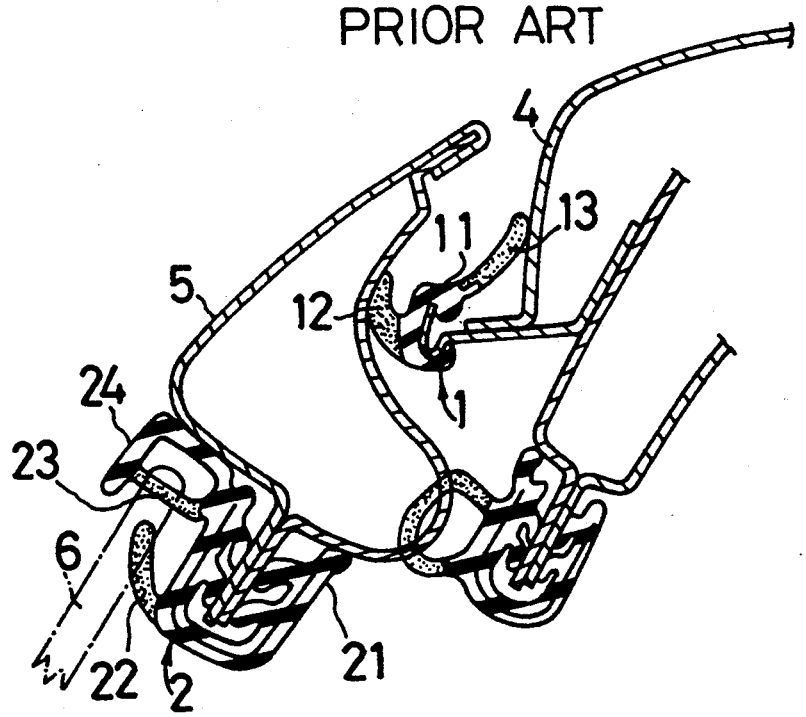
FIG. 8 is a cross-sectional view taken along the line VIII—VIII of FIG. 7, which illustrates the attached state of a roof side weather strip and a door glass weather strip.
Figure 9:
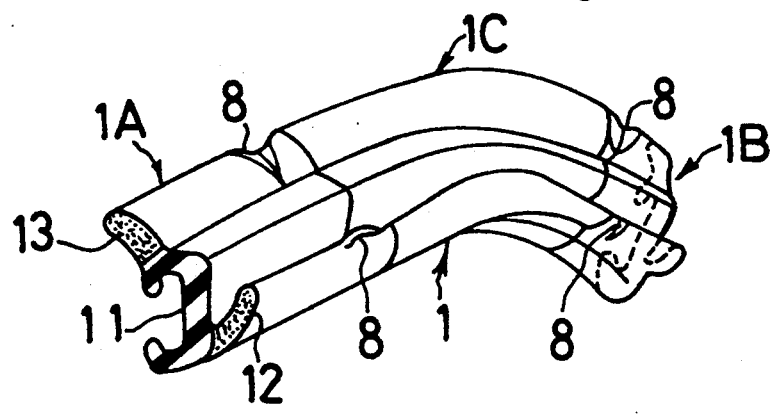
FIG. 9 is a perspective view of a corner portion of a roof side weather strip, which is molded by a conventional method.

After end portions of the extruded weather strips 1A, 1B are mounted on the mold member 3a so that the ends thereof are positioned on lines 38a, 38b provided in the mold member 3a, and the mold members 3a, 3b, 3c, 3d are assembled, a predetermined amount of a molding material composed of solid rubber is injected into the cavity 30 from the gate 31. The molding material flowing towards the ends of the sealing portions 12, 13 of the extruded weather strips 1A, 1B is throttled in the throttled portions 301, 302, spreads outside the throttled portions 301, 302, and reaches the end of the sealing portions 12, 13 of the extruded weather strips 1A, 1B. As a result, the pressure of the molding material which acts on the ends of the sealing portions 12, 13 is decreased as compared with the base portions 11. Accordingly, the ends of the sealing portions 12, 13 are prevented from being forcibly pushed by the molding material, whereby undulations 8 as shown in FIG. 8 are not noticeably generated in the end portions of the sealing portions 12, 13 of the extruded weather strips 1A, 1B.

In the molded portion 1C obtained by this process, recess portions 14C, 15C are formed in conformity with the protruding portions 32, 33 of the mold 3. These recess portions are formed on reverse surfaces of each of the sealing portions 12C, 13C so as not to reduce the sealing properties of the sealing portions 12C, 13C.

Figure 4:
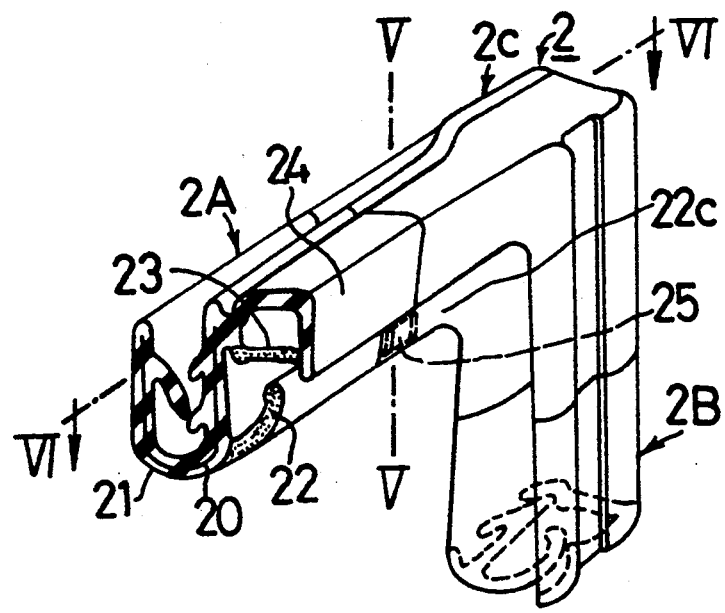
FIG. 4 is a perspective view of a corner portion of a door glass weather strip, which has a molded portion formed by a second embodiment of a method in accordance with the present invention.
Figure 5:
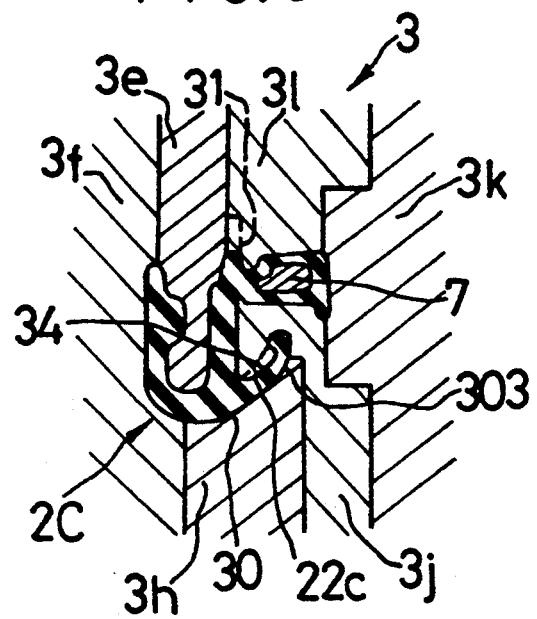
FIGS. 5 and 6 are cross-sectional views of a mold used in the second embodiment, and the molded portion taken along the lines V—V, VI—VI of FIG. 4.
Figure 6:
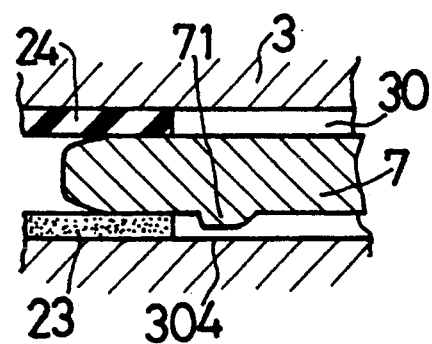

FIGS. 4 through 6 illustrate a second embodiment wherein the method of the present invention is applied to a door glass weather strip 2.

FIG. 4 is a perspective view of a molded portion 2c, which forms the corner portion of the door glass weather strip 2, corresponding to the portion B of FIG. 7. FIG. 5 is a cross-sectional view of a mold assembled for molding with a molded portion taken along the line V—V of FIG. 4 being illustrated within the mold.

A weather strip 2A is an extruded body, with a base portion 21 having a U-shaped cross-section, in which an insert 20 is embedded. A lip-shaped sealing portion 22 projects from a lower side surface of the base portion 21, and a tubular portion 24 projects from an upper side surface of the base portion 21, which has a sealing wall 23 serving as another sealing portion for sealing an edge of a door glass. The sealing portions 22, 23 are composed of sponge rubber, and the base portion 21 and the tubular portion 24 except for the sealing portion 23 are composed of solid rubber. A weather strip 2B is an extruded body composed of solid rubber.

The molded portion 2C, which forms a corner portion connecting two extruded weather strips 2A, 2B, is composed of solid rubber softer than that of the extruded weather strips 2A, 2B. One end of the L-shaped molded portion 2C connected to the extruded weather strip 2A has a cross-sectional shape substantially equal to that of the extruded weather strip 2A while the other end of the L-shaped molded portion 2C connected to the extruded weather strip 2B has a cross-sectional shape substantially equal to that of the extruded weather strip 2B.

The molded portion 2C is formed by a method substantially the same as that of the first embodiment. In the second embodiment, a mold 3 provided with six mold members 3e, 3f, 3h, 3j, 3k and 31 which define a cavity 30, and a core 7 are used, as shown in FIG. 5. Ends of the respective extruded weather strips 2A, 2B are mounted on the mold member 3e in nearly perpendicularly relationship. The mold members 3e, 3f, 3h, 3j, 3k and 31 are assembled, and a core 7 for forming the tubular portion 24 of the molded portion 2C is inserted in the cavity 30. Then, a molding material for forming the molded portion 2C is injected into the cavity 30 from a gate 31 of the mold 3.

A protruding portion 34 protrudes into the passageway of the cavity 30 at a position close to the end of the sealing portion 22 of the extruded weather strip 2A, which is composed of sponge rubber, on the opposite side of the sealing surface of the sealing portion 22C of the molded portion 2C. This protruding portion 34 defines a throttled portion 303 within the cavity 30.

The injected molding material is throttled in the throttled portion 303 of the passageway leading to the end of the sealing portion 22 of the extruded weather strip 2A, and the material spreads outside of the throttled portion 303. As a result, the pressure of the molding material acting on the end of the sealing portion 22 is decreased so that the end of the sealing portion 22 is prevented from being pushed forcefully by the molding material. Accordingly, undulations are not noticeably in the end portion of the sealing portion 22. In FIG. 4, reference numeral 25 designates a recess portion formed by the operation of the protruding portion 34.

The sealing wall 23 of the extruded weather strip 2A is composed of sponge rubber. Sealing wall 23 is not pushed as forcefully by the molding material because both edges of the sealing wall 23 extend longitudinally and are joined to the solid rubber walls of the tubular portion 24 respectively. Accordingly, in the passageway leading to the sealing wall 23, a throttled portion as is required in the passageway leading to the sealing portion 22 need not necessarily be provided.

Of course, by providing a throttled portion in the passageway leading to the sealing wall 23, the generation of undulations of the sealing wall 23 may be further decreased.

FIG. 6 illustrates a cross-section of the mold 3 taken along the line VI—VI of FIG. 4. A protruding portion 71 is formed on the core 7 at a position close to the end of the sealing wall 23 of the weather strip 2A. This protruding portion 71 defines a throttled portion 304 in the passageway of the cavity 30. By virtue of the throttled portion 304, the pressure of the molding material acting on the end of the sealing wall 23 is decreased, and accordingly, undulations are prevented from being generated in the end portion of the sealing wall 23.

In accordance with the present invention, the molded portion composed of solid rubber may be formed onto an end of the extruded weather strip without generation of any undulation in the end portion of the sponge rubber portion of the extruded weather strip. Accordingly, the obtained weather strip can exhibit uniform sealing properties over the entire length thereof.

The application of the present invention is not limited to the connection of the roof side weather strips or that of the door glass weather strips. The present invention can be widely applied to the connection of other types of weather strips, the formation of the molded end portion of a single weather strip, or the like.

What is claimed is:

1. A method for forming a molded portion composed of solid rubber onto an end of an extruded weather strip, said method comprising the steps of:

providing said extruded weather strip having a base portion composed of solid rubber and a sealing portion composed of sponge rubber;

inserting an end of the extruded weather strip into one end of a cavity of a mold so that an end face of both said base and sealing portions of the extruded weather strip forms an end wall of the cavity;

injecting a molding material that becomes solid rubber into said cavity from a gate of said mold, and preventing undulations in a surface of said sealing portion adjacent the end face thereof by selectively throttling only the molding material flowing in said cavity to said end face of the sealing portion of the extruded weather strip, the throttling occurring in a throttled portion formed in a passageway of said cavity, the passageway leading the molding material to the end face of the sealing portion of the extruded weather strip, at a position close to the end face of the sealing portion, said throttled portion being defined by a protruding portion which protrudes into said passageway from a side thereof on the opposite side of a sealing surface of the sealing portion so as to reduce the pressure of the molding material acting on the end face of the sealing portion of the extruded weather strip relative to the pressure of the molding material acting on said end face of the base portion of the extruded weather strip.

2. The method according to claim 1, wherein the inserting step includes inserting into a second end of said cavity an end of a second extruded weather strip having a base portion composed of solid rubber and a sealing portion composed of sponge rubber, said second extruded weather strip having for both of its base and sealing portions an end face which forms for said cavity a second end wall spaced from the first mentioned end wall, and as to the injected molding material flowing toward said second weather strip, preventing undulations in a surface of said sealing portion of said second extruded weather strip by selectively throttling only a portion thereof which flows to said end face of the sealing portion for the second weather strip, said throttling being achieved by providing a protruding portion which protrudes into a passageway leading the molding material to the sealing portion of said second extruded weather strip to reduce the pressure of the molding material acting on the end face of the sealing portion of the second weather strip relative to the pressure of the molding material acting on said end face of the base portion of the second weather strip.

3. A method for forming a molded portion composed of solid rubber onto an end of an extruded weather strip which has a base portion composed of solid rubber and extending therefrom a sealing portion composed of sponge rubber, said method comprising the steps of:

inserting an end of the extruded weather strip into one end of a cavity of a mold so that an end face of both said base and sealing portions of the extruded weather strip forms an end wall of said cavity;

injecting into said cavity under a predetermined pressure a given amount of molding material which flows in and is sufficient to fill said cavity and which becomes solid rubber; and preventing undulations from occurring in a surface of said sealing portion by preventing said molding material from excessively pushing against said end face of said sealing portion with said predetermined pressure by selectively throttling only the molding material flowing toward said sealing portion, said throttling being achieved by providing a protruding portion which protrudes into a passageway leading the molding material to the sealing portion to reduce the pressure of the molding material on said end face of the sealing portion relative to the predetermined molding material pressure on said end face of said base portion.

4. A method for forming a molded portion composed of solid rubber between the ends of first and second weather strips each of which has a base portion composed of solid rubber and extending therefrom a sealing portion composed of sponge rubber, said method comprising the steps of:

inserting an end of said first weather strip into one end of a cavity of a mold so that an end face of both said base and sealing portions of the first weather strip forms a first end wall of the cavity, inserting an end of said second weather strip into a second end of said cavity so that an end face of both said base and sealing portions of said second weather strip forms for said cavity a second end wall spaced from and opposing said first end wall, injecting into said cavity under a predetermined pressure a given amount of molding material which flows in and is sufficient to fill said cavity and which becomes solid rubber, and preventing undulations from occurring in a surface of both of said sealing portions by preventing said molding material from excessively pushing against said opposing end faces of said sealing portions by selectively throttling only the molding material flowing toward said end faces of the sealing portions, said throttling being achieved by providing protruding portions which protrude into passageways leading the molding material to the sealing portions to reduce the pressure of the molding material on said end faces of the sealing portions relative to the predetermined molding material pressure on end faces of said base portions.

5. A method for forming a molded portion composed of solid rubber onto an end of an extruded weather strip, said method comprising the steps of:

providing said extruded weather strip having a base portion composed of solid rubber and a sealing lip composed of sponge rubber, said sealing lip extending from said base portion;

inserting an end of the extruded weather strip into one end of a cavity of a mold, said mold having a cross-sectional shape identical with that of the end of the extruded weather strip, so that an end face of both said base portion and said sealing lip of the extruded weather strip form an end wall of the cavity.

injecting a molding material that becomes solid rubber into said cavity from a gate of said mold, and preventing undulations in a surface of said sealing lip adjacent the end face thereof by selectively throttling only the molding material flowing in said cavity to said end face of the sealing lip of the extruded weather strip, the throttling occurring in a throttled portion formed in a passageway of said cavity, said passageway leading the molding material to the end face of the sealing lip of the extruded weather strip, at a position close to the end face of the sealing lip, said throttled portion being defined by a protruding portion which protrudes into said passageway from a side thereof on the opposite side of a sealing surface of a molded sealing lip, whereby the pressure of the molding material acting on the end face of the sealing lip of the extruded weather strip is reduced relative to the pressure of the molding material acting on said end face of the base portion of the extruded weather strip.

* * * * *